Patented June 18, 1940

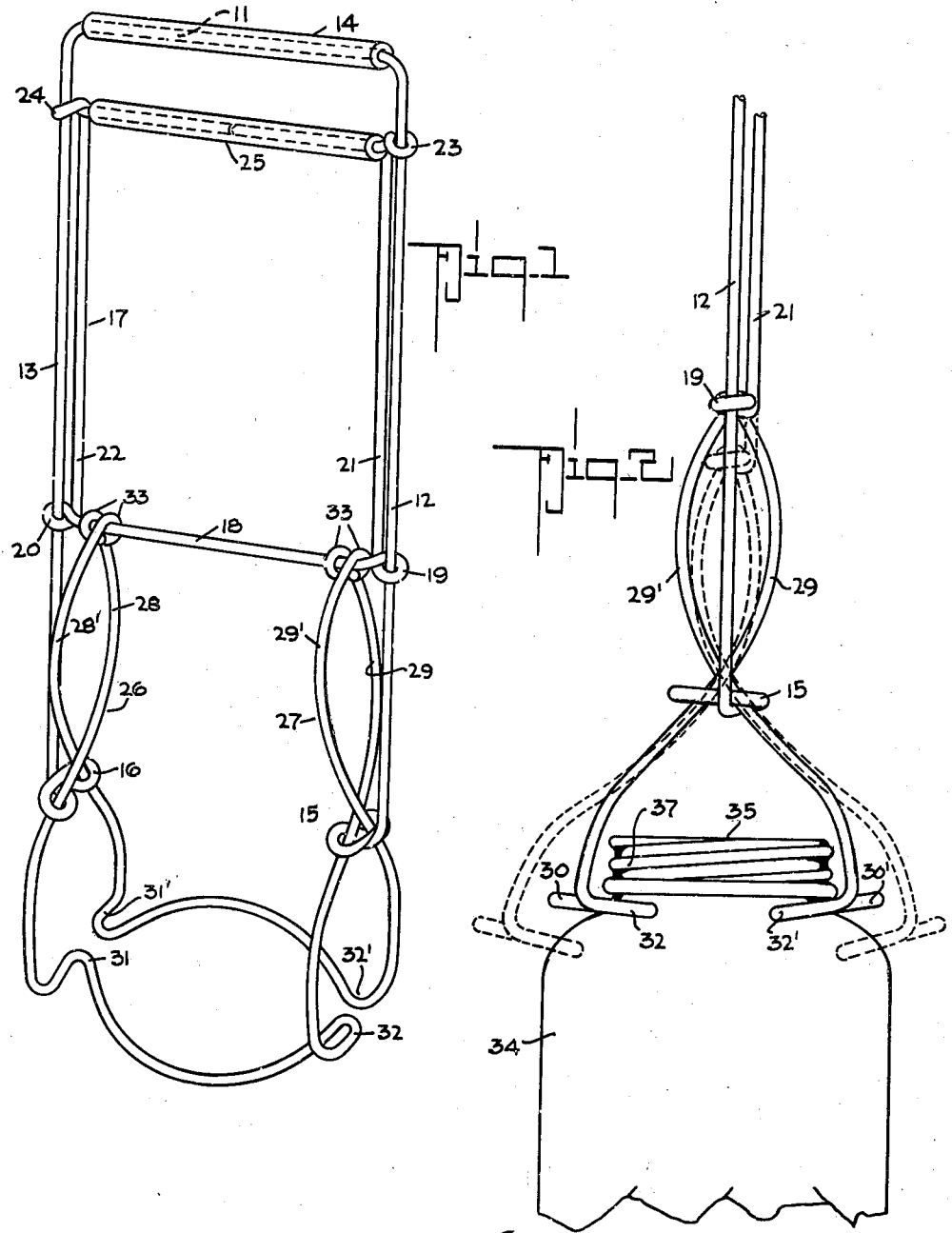

2,204,843

UNITED STATES PATENT OFFICE 2,204,843

LIFTER

Henry L. Campbell, Coulee City, Wash., assignor of one-half to Harry C. Lewis, Mazama, Wash.

Application October 17, 1938, Serial No. 235,457

1 Claim. (Cl. 294—31)

My present invention relates to lifters of a nature capable of gripping open mouthed jars, bottles, cans, and the like, and is particularly adapted for use by canners, food handlers, and other persons who must handle containers as above described, in the presence of hot water or steam.

The principal object of my device has been the provision of a simple lifter made of formed wire which would simply and efficiently grip a jar or can for the purpose described.

Another object of my invention has been to provide a device having insulating handle means for the protection of the user thereof.

A further object of my invention has been to provide a lifter of the double-jar type which can be operated one-handedly.

A still further object of my invention has been the provision of a double jaw-type lifter which will quickly open to the maximum space between the jaws and quickly close and grasp a desired container firmly and securely.

Other objects and advantages of the invention will be apparent during the course of the following description.

In the accompanying drawing, forming a part of this specification and in which like numerals are employed to designate like parts throughout the same, Figure 1 is a perspective view in elevation of the lifter of my invention detailing the parts comprising the device; and Figure 2 is an elevational view showing the device in approximately the gripping position about the neck of a jar with the extension of the jaws indicated by dotted lines.

As has been mentioned before, my lifter device is composed of parts formed by shaping wire. It is advisable to use rust-resisting, non-corrosive wire because of the use of the device in the presence of steam, water, or other hot liquids.

A U-shaped member has a cross bar 11 and downwardly extending legs 12 and 13. An insulating handle 14 is provided in the area comprising the cross bar 11. The lower ends of the downwardly extending arms 12 and 13 are formed into duplex twists 15 and 16, the wires forming the member 10 terminating at this point. A rectangular slide frame 17 is provided having a cross bar 18 terminating in loops 19 and 20 which engage the side bars 12 and 13. Upwardly from the loops 19 and 20 extend side bars 21 and 22, the upper ends of which are formed into sliding loops 23 and 24. The remaining portions of the rods forming these latter mentioned loops are then bent toward each other and terminated adjacent each other within the insulating finger handle 25. Pivotally depending from the cross bar 18 are substantially rectangular elements 26 and 27 which form the jaws of my lifter. The element 26 shown as having side rods 28 and 29 is of an ogee shape and the material joining its lower end is formed into an arcuate jaw member 30 and looped prongs 31 and 32.

The jaw member 27 comprises similar ogee shaped side arms 28' and 29' having a jaw portion 30' and looped prongs 31' and 32'. It will be apparent from the drawing of Figure 1 that the arms 28, 28' and 29, 29' slide through the duplex loops 15 and 16 of the side bars 12 and 13 and that their upper ends terminate in a twisted hinge as 33 formed about the cross bar 18.

In Figure 2 I have illustrated a jaw 34 having a relatively wide mouthed opening 35. As is customary, the jar as shown, is provided with a bead 36 at the termination of the threaded cap-engaging portion 37.

Method of operation

In use the device of my invention is grasped by the operator so that the handle 14 rests against the ball of the hand and the digit fingers are hooked over the handle 25. Because of the free action obtained by the construction of my device, the rectangular slide frame 17 will usually drop downwardly and cause the ogee side arms of the jaw members to extend themselves through coaction with the loops 15 and 16.

The device is now in position to grasp a container such as a Mason jar as is shown in Figure 2. To bring the jaws 30 and 30' into engagement around the neck of the container the operator may close his hand, the fingers lifting the slide frame 17. A very strong grip is exerted through my unique construction accomplished by the leverage action of the jaw members.

It will be apparent that the efficiency of the device depends primarily upon the grip attained, rather than by the engagement of the arcuate jaws under a rim or protruding bead upon a container.

This device is particularly efficient for canners who must remove jars or cans from steam cookers or boilers where everything is extremely hot. The efficiency of the device is further to be recognized in the use of a relatively light weight material capable of cooling rapidly.

Having thus fully described my invention, what

I claim as new and desire to secure by Letters Patent is:

A lifter comprising an inverted U-shaped wire frame forming a handle at its closed end and having guide loops formed of the material of the frame at the terminal ends of the depending legs, a rectangular slide frame comprising side bars and top and bottom cross bars and loops formed at the junctures of the side bars with the top and bottom bars around the legs of the U-frame, and a pair of arcuate jaws pivotally supported from the bottom cross bar of the slide frame and having ogee shaped side members passing through the guide loops and cooperating therewith whereby movement of the slide frame opens and closes the jaws.

HENRY L. CAMPBELL.